United States Patent [19]
Jourdain et al.

[11] Patent Number: 5,542,607
[45] Date of Patent: Aug. 6, 1996

[54] SUPERSONIC NOZZLE, IN PARTICULAR FOR A TURBOJET ENGINE

[75] Inventors: Gérard E. A. Jourdain, Saintry sur Seine; Marcel R. Soligny, Chevilly-Larue, both of France

[73] Assignee: Societe Nationale D'Etude et de Construction de Moteurs D'Aviation S.N.E.C.M.A., Paris Cedex, France

[21] Appl. No.: 448,528

[22] Filed: Nov. 24, 1982

[30] Foreign Application Priority Data

Nov. 24, 1981 [FR] France ................................. 81 21980

[51] Int. Cl.⁶ .................................................. F02K 1/12
[52] U.S. Cl. ............................................... 239/265.41
[58] Field of Search ........................... 60/230, 232, 242, 60/271; 239/265.33, 265.35, 265.37, 265.39, 265.41

[56] References Cited

U.S. PATENT DOCUMENTS

| 3,786,992 | 1/1974 | Robinson | 239/265.39 |
|---|---|---|---|
| 3,837,580 | 9/1974 | Camboulives et al. | 239/265.39 |
| 3,954,225 | 5/1976 | Camboulives et al. | 239/265.41 |
| 4,000,854 | 1/1977 | Konarski et al. | 239/265.39 |
| 4,128,208 | 12/1978 | Ryan et al. | 239/265.39 |

*Primary Examiner*—Stephen C. Bently
*Attorney, Agent, or Firm*—Bacon & Thomas

[57] ABSTRACT

A turbojet engine has an outlet duct to which an annular array of actuating cylinders for nozzle flaps are hinged. The housings for the cylinders are connected together by transverse members to form a rigid structure coaxial with the outlet duct. The arrangement includes convergent flaps and slaving devices for divergent flaps, all hinged to the rigid structure and particularly to the housings.

22 Claims, 8 Drawing Sheets

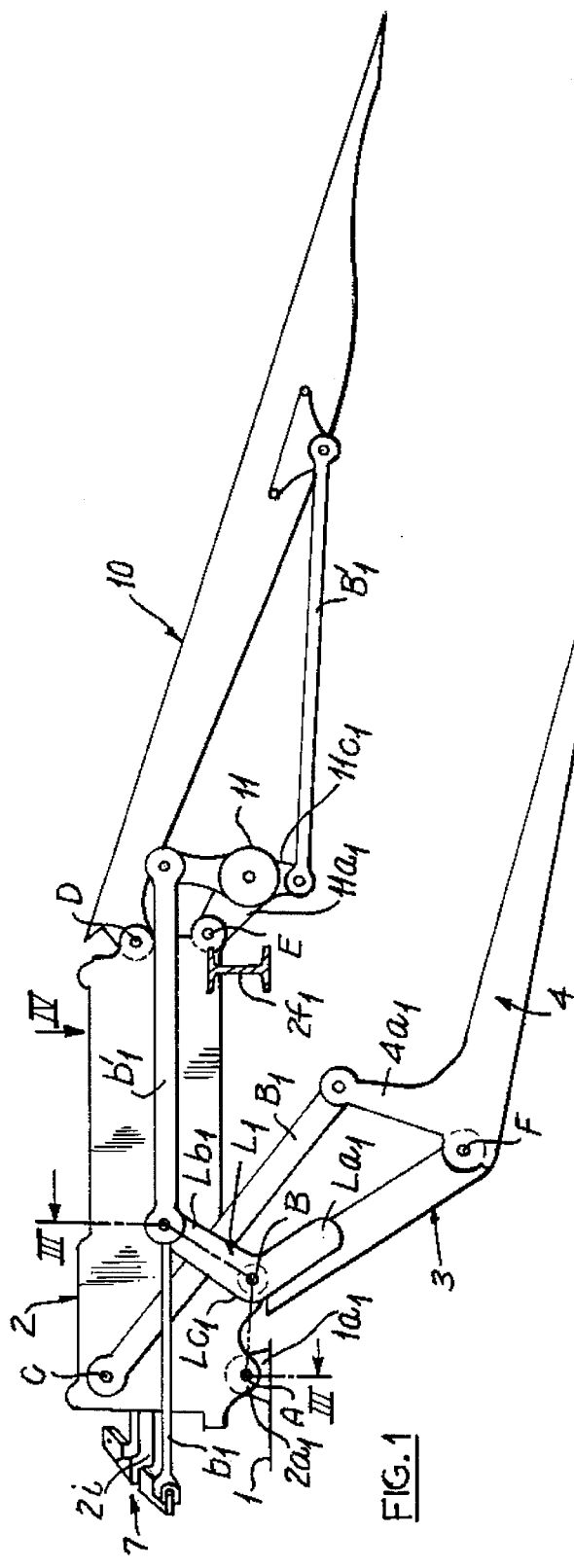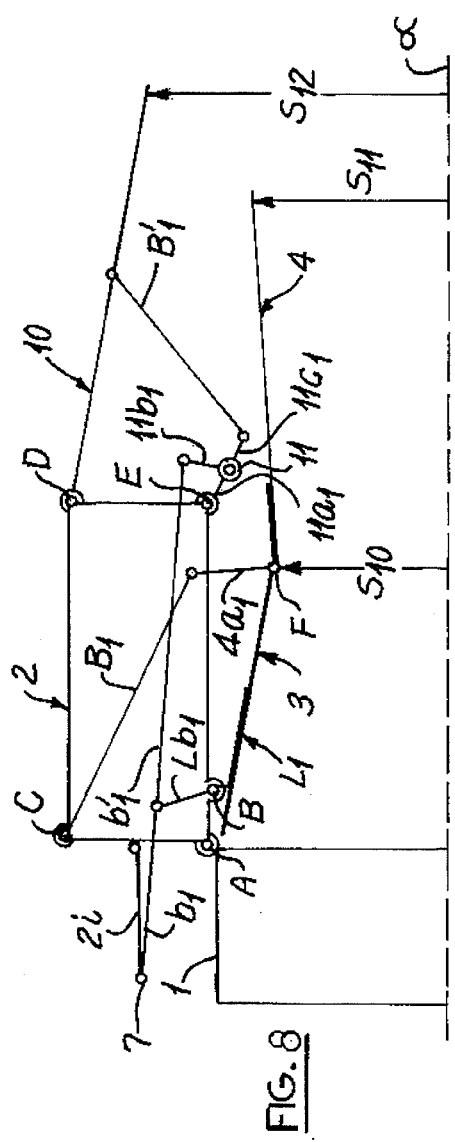

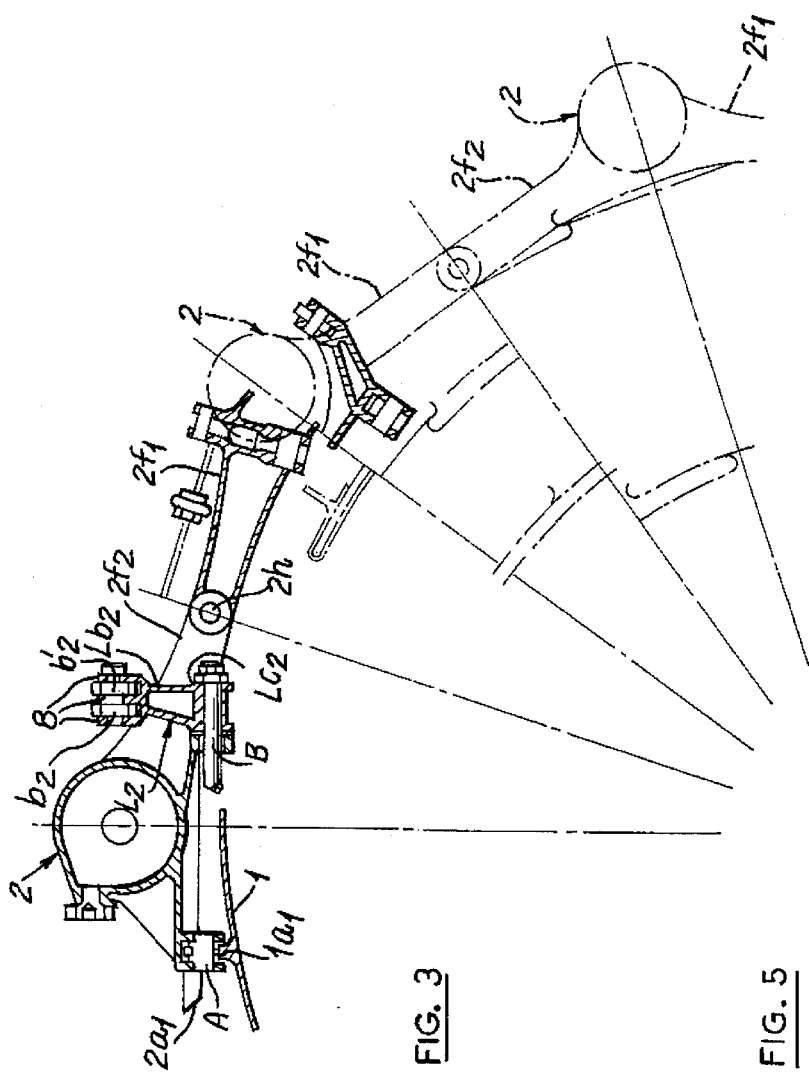
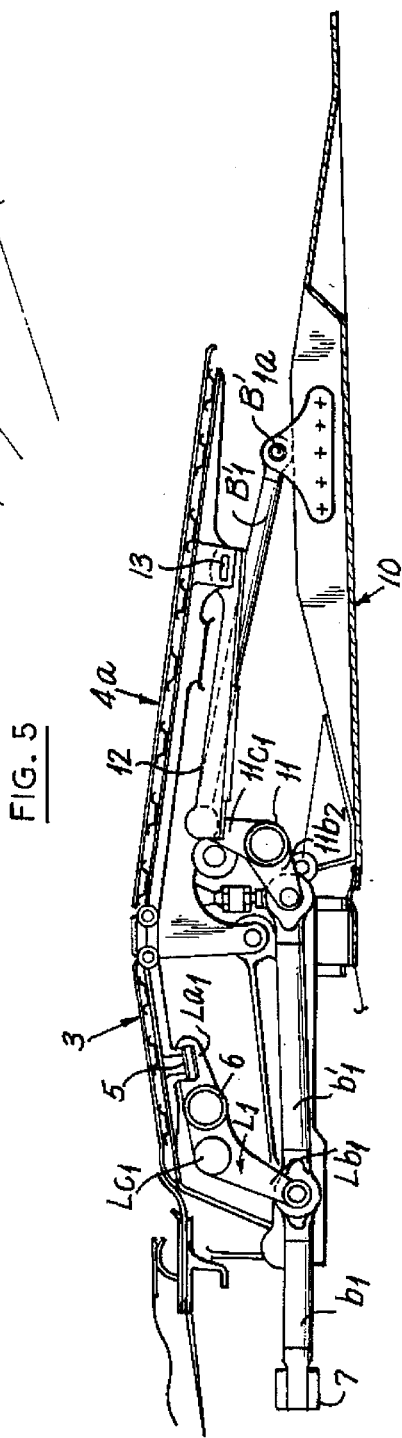
FIG. 3
FIG. 5

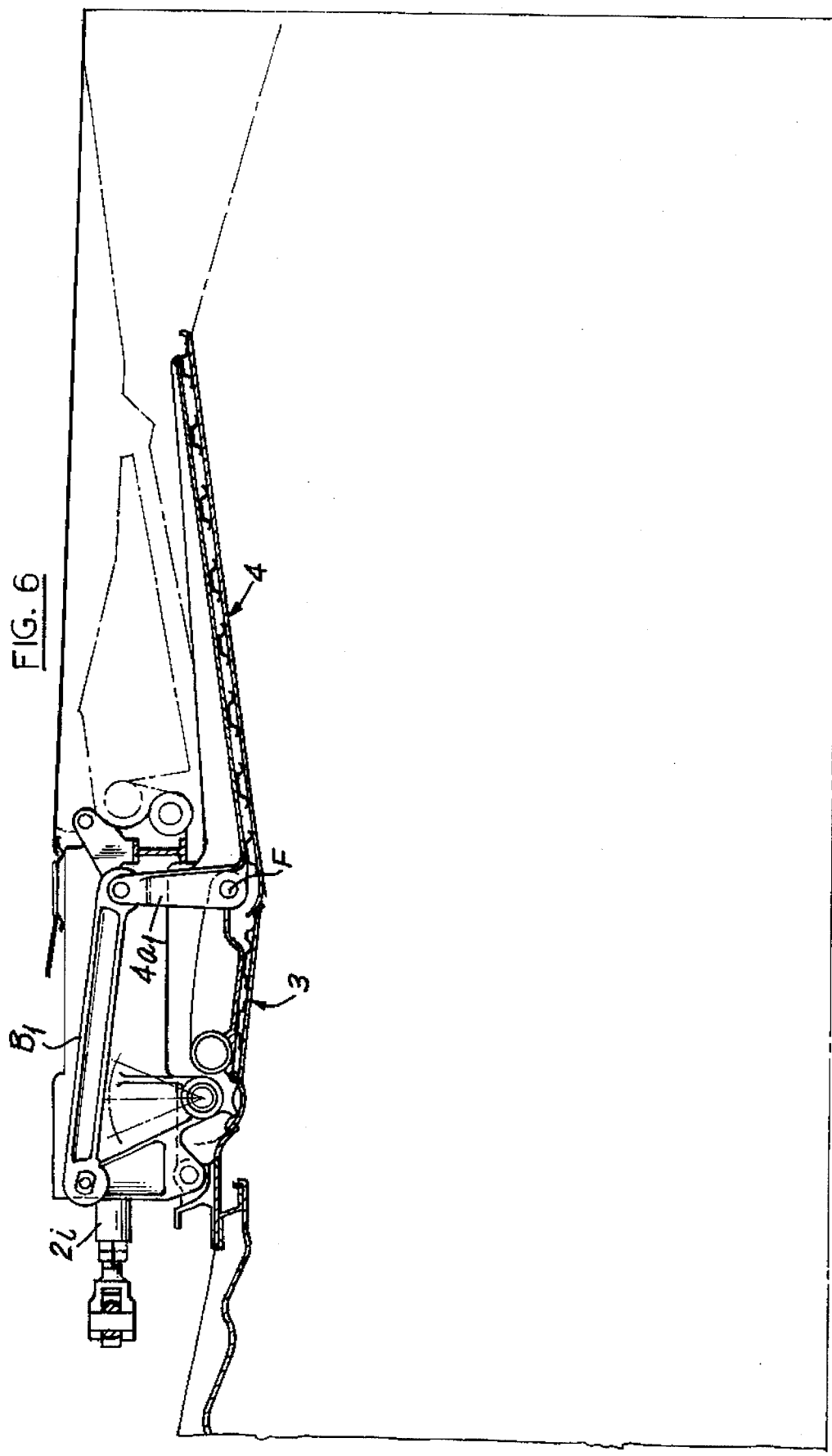

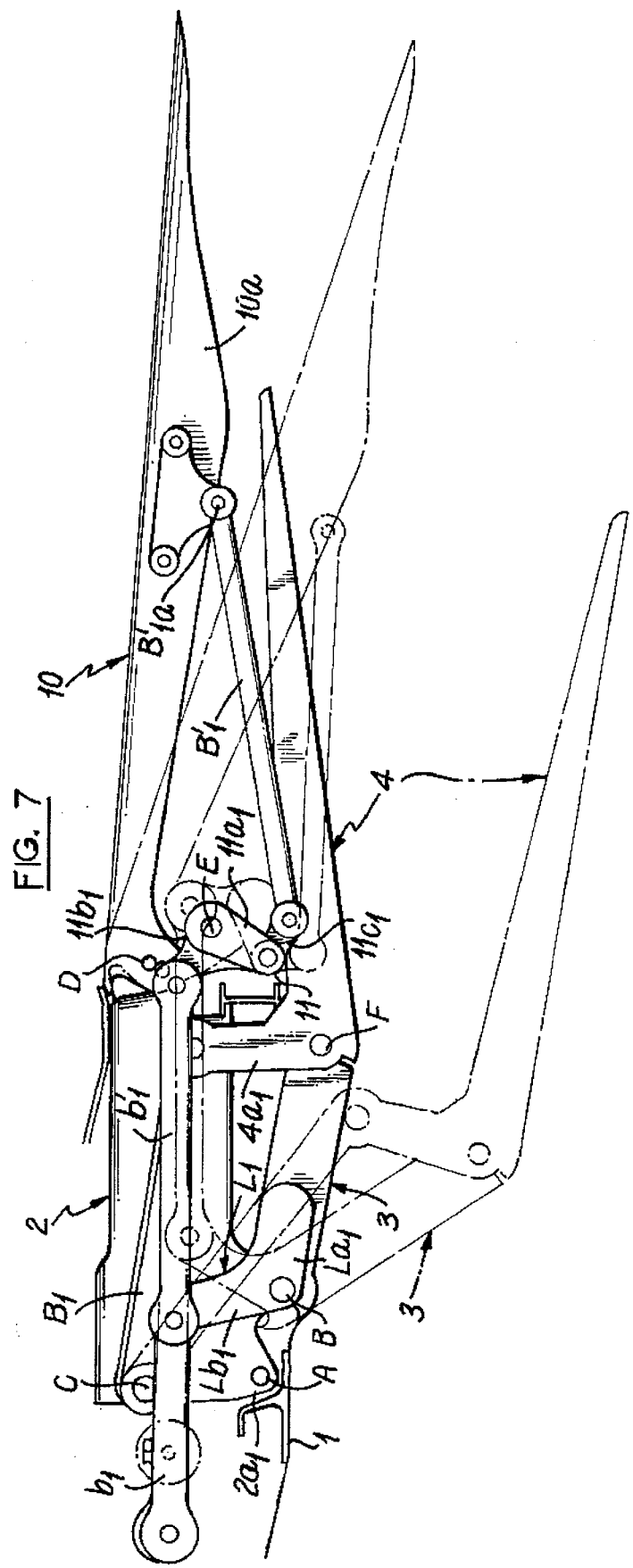

SUPERSONIC NOZZLE, IN PARTICULAR FOR A TURBOJET ENGINE

BACKGROUND OF THE INVENTION

The present invention concerns a supersonic nozzle, in particular for a turbojet engine.

The U.S. application of Hardy et al Ser. No. 336,491, filed 30 Dec. 1980, by the assignee of the present application, describes supersonic nozzles, each comprising essentially two annular systems of convergent flaps and divergent flaps which have their upstream edges hinged at the downstream edges of the convergent flaps. Actuating cylinders are distributed regularly about the duct outlet, and are coupled at appropriate points to every other convergent flap, so as to cause the position of at least every other divergent flap to vary with that of the corresponding convergent flap. Devices are shown for synchronizing the pivoting of the convergent flaps, so as to pivot with respect to the duct outlet.

Supersonic nozzles of known type, as will be pointed out, encounter problems of bulkiness and mass, in particular. Indeed, the total drag of the turbojet engine pod and, in particular, the so-called "base" drag, which has a strong influence on the performance of the turbojet engine, depends on the lateral moment of inertia of the nozzle itself. It thus would be desirable, in order to improve the performance of the turbojet engine, to reduce the lateral moment of inertia of the engine's supersonic nozzle. This result is, however, particularly difficult to arrive at because of the need to install the different devices required to control and synchronize the many flaps, (the actuating cylinders, rods, levers, etc.) between the stiffeners of the nozzle structure. Then there is a need for an arrangement to provide the necessary clearances for the different flaps and controls, as well as a need to retain a certain permeability within the assembly to permit adequate ventilation and, as a result, proper cooling of the different nozzle components. The present invention makes it possible to resolve all these problems, and to realize a supersonic nozzle of the type indicated that nevertheless is distinguished advantageously from previous realizations by a reduced lateral moment of inertia and total mass.

SUMMARY OF THE INVENTION

The supersonic nozzle of the present invention is characterized by the fact that the housings of the different actuating cylinders are attached and preferably hinged at the annular edge of the duct outlet and are interlocked by transverse members that form, with the housings of the actuating cylinders, a rigid, approximately polygonal or circular structure that is coaxial at the edge of the duct outlet. The upstream edges of the corresponding convergent flaps, as well as the slaving devices of the divergent flaps with which they are coupled, respectively, are hinged to the aforesaid rigid structure, and preferably to the housings of the actuating cylinders proper.

The supersonic nozzle of the present invention is thus basically distinguished from previous designs in that its different flaps, as well as their different controls, all are supported by a rigid structure coaxial at the edge of the duct outlet, the principal bearing components which are comprised by the housings of the control actuating cylinders. These housings are the only attachment of the nozzle assembly to the edge of the duct outlet.

Therefore, the present invention makes it possible to effect a saving, in stiffeners, shrouds, and other structural members which were necessary in all previous designs of supersonic nozzles of the type considered in order to support the different flaps and their controls. The obvious result is a significant reduction in the total mass of the nozzle, as well as a substantial saving in materials. The elimination of the conventional structural members previously mentioned also makes it possible to reduce the lateral moment of inertia of the nozzle while at the same time increasing its permeability because air and gases can circulate more freely. Further, because the nozzle assembly is secured only to the housings of the control actuating cylinders at the annular edge of the duct outlet, the nozzle is an independent module that can be easily removed from the engine, thus facilitating maintenance and adjustments. In addition, since the housing of each control actuating cylinder individually supports certain of the nozzle flaps, and the mechanical devices associated with the flaps, this system can be separated easily from the other, similar systems to provide independent maintenance and adjustments as the occasion may warrant.

The present invention is applicable in a particularly advantageous way to supersonic nozzles of the type indicated that are each fitted with actuating cylinders having linear movement, each of which is installed in what is the approximate axial plane of the nozzle as described in U.S. patent application Ser. No. 336,491, as well as in French Certificate of Addition No. 72.35502, filed by the assignee to the present application on 6 Oct. 1972. In this application the housing of each control actuating cylinder is thus hinged at the edge of the duct outlet at first points in the vicinity of the upstream end of the actuating cylinder housing. The upstream ends of the corresponding convergent flaps are hinged at second points on the actuating cylinder housing located a short distance downstream from the first points. Transverse members of the rigid structure are formed integral with the housings of the actuating cylinders. In a preferred form, the approximately cylindrical housing of each actuating cylinder has two transverse components near its downstream end designed in a manner to follow, approximately, the annular edge of the duct outlet downstream from this edge. The transverse members of two adjacent actuating cylinders turned toward each other are fixed together by any appropriate means, by bolts and screws, for example, so as to form a rigid structure with the housings of the actuating cylinders, such structure being approximately polygonal or circular.

The present invention also is applicable to supersonic nozzles of the type which also has a third annular system of so-called "cold" flaps extending beyond the primary flaps at least as far as the downstream edges of the divergent flaps in a manner such as to cover them, but without making contact. In this application of the present invention the upstream edges of the cold flaps are also hinged to the rigid structure, to the downstream ends of the actuating cylinders that move linearly, for example.

As has already been pointed out, all the stresses applied to the different flaps of the supersonic nozzle in accordance with the present invention are transmitted by the flaps themselves, and by the various other mechanical devices, to the rigid structure in particular, to the housings of the control actuating cylinders that generate the stresses. Because of the risk that the significant stresses thus transmitted to the housings of the command actuating cylinders can deform these latter which can interfere with the proper operation of these latter, or at the very least result in a reduction in their service life, it is advantageous to equip the nozzle having actuating cylinders with a linear movement. The system comprised of the cylinder, the piston, and the rod of each actuating cylinder is contained, with appropriate clearance, in a very rigid cylindrical housing, on which only the transverse components of the rigid structure and the various hinges are mounted. In addition, it is anticipated that the cylinder will be secured in the cylinder housing so it can be removed, and in a manner such that housing and cylinder will be in contact with each other only over reduced surfaces. The cylinder of the actuating cylinder and the cylindrical housing are arranged in a manner such that they will be in contact only at a short cylindrical bearing surface and at a narrow annular radial bearing surface, where the flange of the aforesaid cylinder is tightened down, for example, by an annular nut that is screwed onto, or into, the cylinder housing.

It is clear that the significant stresses applied to the cylindrical housing of each control actuating cylinder will be transmitted to the cylinder proper of the aforesaid actuating cylinder, that is, the cylinder's piston guide, only at the corresponding contact surfaces. These can be arranged and dimensioned in a manner such that the risks of deforming the cylinder are virtually negligible, particularly when the clearance of the cylinder in the housing of the actuating cylinder is taken into consideration. The result includes the following additional advantages: the system formed by the cylinder, the piston, and the rod of each actuating cylinder can be separated easily from its cylindrical housing by unscrewing the corresponding annular nut. This makes it possible to ensure that the aforesaid system can be maintained and adjusted independently of the other components of the nozzle and, in particular, independently of the other control actuating cylinders. In another connection, it is possible to make the cylinder of each actuating cylinder from a material, for example, from cast iron, or from steel, different from the material from which the housing of each of the actuating cylinders is made. The actuating cylinder housings can be made of a titanium alloy, among others, and the assembly of these housings forms the approximately polygonal, or circular, rigid structure as explained above.

BRIEF DESCRIPTION OF THE DRAWINGS

By way of an example, described in what follows and illustrated schematically in the attached drawings, is one preferred form of a supersonic nozzle embodying the present invention.

FIG. 1 is a view that is in part an elevation and in part perspective, of the nozzle flaps of the invention, as well as of the control actuating cylinders, the systems of which form the rigid structure of the nozzle;

FIG. 3 is a partial sectional view taken on line III—III of FIG. 1;

FIGS. 5 and 6 are partial sectional views taken on lines V—V and VI—VI of FIG. 4;

FIG. 7 is a view approximately corresponding to FIG. 1, showing the limits of the flaps of the nozzle in accordance with the present invention.

FIG. 8 is a schematic diagram, the purpose of which is to explain the operation of the nozzle of the present invention.

DESCRIPTION OF THE PREFERRED EMBODIMENTS

Figure 2:
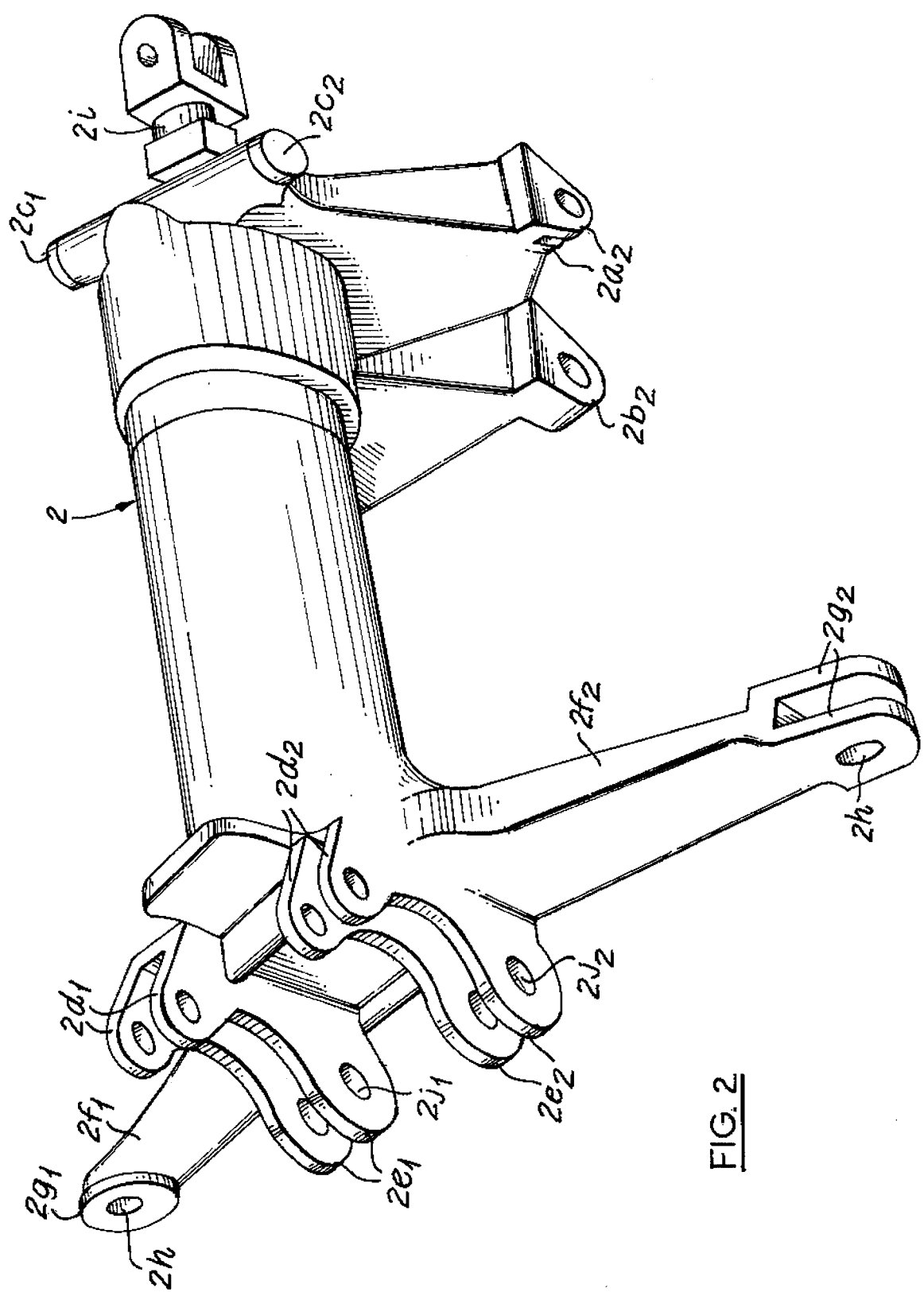
FIG. 2 is a perspective view of the command actuating cylinder in FIG. 1.

In FIG. 1, 1 designates the annular edge of a duct outlet of a turbojet engine (not shown), and 2 designates one of the control actuating cylinders for the different flaps of the supersonic nozzle in accordance with the present invention. In the example under consideration, what is involved is an actuating cylinder for linear movement, the housing of which has, at the lower part (in FIG. 1) of its upstream end, clevises $2a_1$ and $2a_2$ (see also FIG. 2), which cooperate with the corresponding clevises such as $1a_1$, fixed to the annular edge, 1, of the duct outlet, to form, with the corresponding pins, (not shown) hinge axis such as A. This enables actuating cylinder 2 to pivot with respect to edge 1 of the duct about a geometric axis A that is approximately tangent to this edge 1. As will be seen in particular in FIGS. 2, 3 and 4, the actuating cylinders have a linear movement, such as 2, and are arranged respectively in planes approximately axial with the nozzle regularly spaced around the periphery of annular edge 1 of the outlet duct. The cylinders have, respectively, approximately cylindrical housings, each of which has, for example, near its downstream end (that is, to the right in FIGS. 1 and 4, but to the left in FIG. 2), two transverse members, $2f_1$ and $2f_2$, which in the example illustrated in particular in FIG. 2, are cast integral with the actual cylindrical housing of actuating cylinder 2. In FIG. 3, as well as FIG. 4 (in which however only one of the actuating cylinders 2 has been shown, the other having been omitted for reasons of clarity), shows clearly that transverse members $2f_1$ and $2f_2$, directed to two control actuating cylinders adjacent to each other and are secured to each other by whatever means are appropriate. In the example illustrated in FIG. 2, the end of each transverse member $2f_1$, forms a single clevis $2g_1$, whereas the end of the other transverse member $2f_2$ forms a twin clevis $2g_2$ between the two arms of which the single clevis $2g_1$ of the corresponding transverse members $2f_1$ of the adjacent cylinder can be inserted in a manner such as to align the holes $2h$ in the aforesaid clevises, as will be seen in particular in FIG. 3. In this example, the matching clevises can be secured to each other by a bolt, for example, inserted in the aligned holes $2h$ and a nut. It is understood that the system of housings of the control actuating cylinders 2 because they are hinged about axis A by clevises $1a_1$ integral with annular edge 1 of the duct, and which are interassembled by their transverse members $2f_1$ and $2f_2$, form a rigid structure that is coaxial with edge 1 of the duct outlet. All the other components of the supersonic nozzle in accordance with the present invention and, in particular, the different flaps and their controls activated by actuating cylinders 2 are mounted on this rigid structure, as will be described in more detail in what follows. In the example shown in particular in FIG. 3, transverse members $2f_1$ and $2f_2$ are shaped to follow, approximately, the annular edge 1 of the outlet duct as will be seen in FIG. 1. The rigid structure mentioned thus has an approximately polygonal shape, but it also could have a coaxial circular shape at edge 1 of the duct outlet.

The supersonic nozzle in accordance with the present invention comprises, in a known manner, two annular systems of flaps: a system of convergent flaps such as 3; and a system of divergent flaps such as 4. The number of flaps in each of these two systems is double the number of control actuating cylinders, and the flaps are arranged in a manner such that the median plane of one of each two flaps coincides, approximately, with the axial plane of the nozzle passing through the axis of one of the control actuating cylinders 2. Consequently two flaps 3 and 4 are directly connected to each control actuating cylinder 2 and the interval between the pairs of flaps connected respectively to two adjacent control actuating cylinders is closed by a third pair of intermediate flaps.

In accordance with the present invention, the upstream edge of each convergent flap 3 is connected to a control actuating cylinder assembly 2, by being hinged to the cylinder housing of the assembly at a second axis such as B. The second axis B is located a short distance downstream from the first axis A, about which the actuating cylinder assembly 2 is hinged at the edge 1 of the outlet duct.

Figure 4:
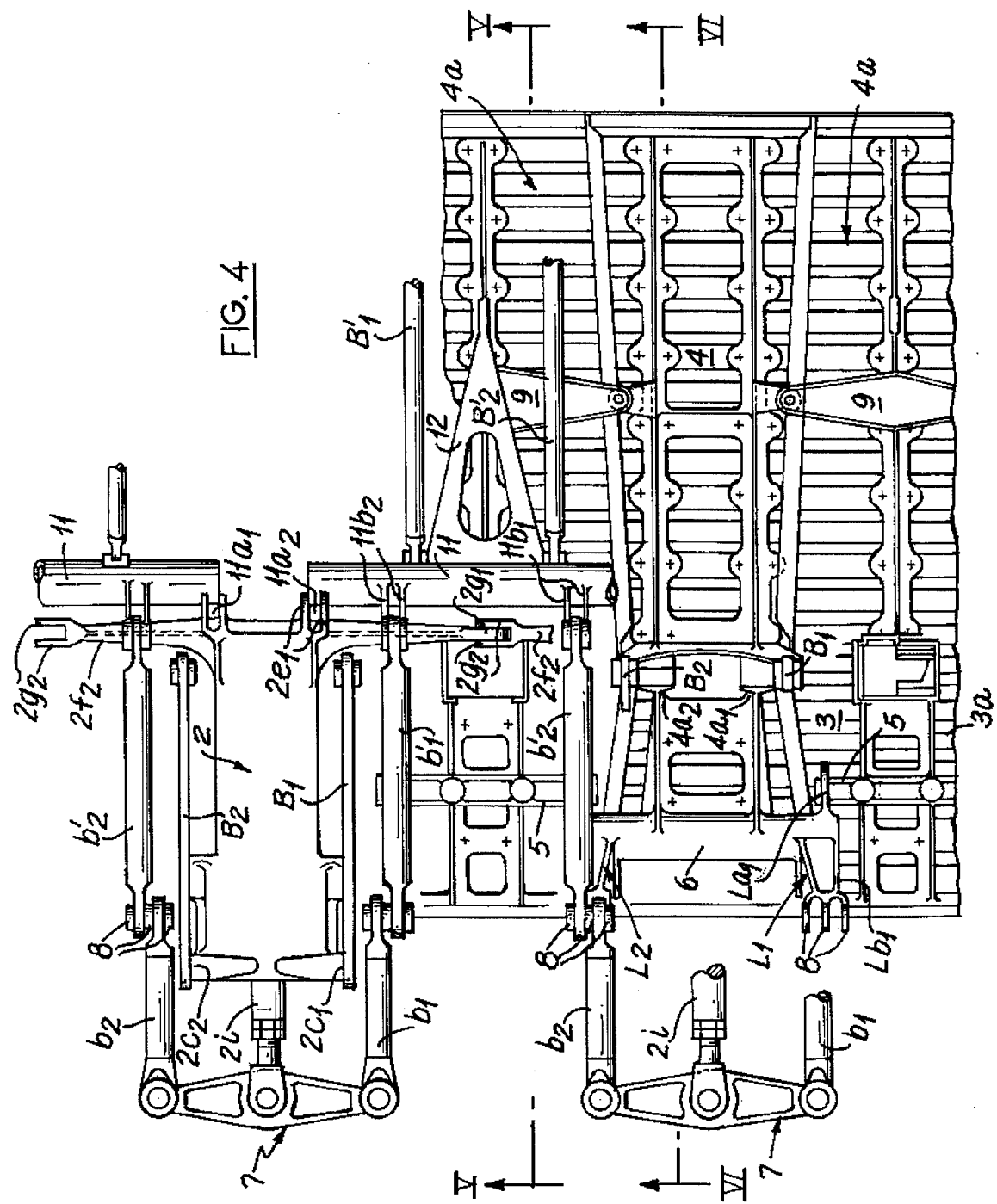
FIG. 4 is a view in the direction of arrow IV in FIG. 1, certain of the control actuating cylinders having been left out in order to retain the clarity of the figure.

In the form considered, each convergent flap 3 connected to an actuating cylinder assembly 2 is attached to the cylinder housing by two bell cranks $L_1$ and $L_2$ (see FIGS. 1, 3, 4 and 5), which are parallel to the central longitudinal axial plane passing through the axis of the corresponding control actuating cylinder assembly 2. As will be seen in FIGS. 1 through 5, each bell crank $L_1$ for example, has a first arm $La_1$, integral with the corresponding convergent flap 3, an elbow $Lc_1$, which is hinged on a pin at second axis B on the actuating cylinder housing and a second arm $Lb_1$ which is bent toward the exterior of the nozzle, as will be seen in FIG. 5. The first arm $La_1$ of each bell crank has, on the side of the corresponding convergent flap 3 a recess to take a small bar 5 which, as will be seen in FIG. 4, is at the same time secured to convergent flap 3 connected to the corresponding control actuating cylinder 2 and to the closest intermediate flap 3a. On the other hand, the two parallel bell cranks $L_1$ and $L_2$, which are connected to the same control actuating cylinder assembly 2 and arranged approximately in planes parallel to both sides of the housing of actuating cylinder assembly 2 have their first arms $La_1$ and $La_2$ coupled by a transverse component, such as a tubular part 6 (FIGS. 4 and 5), which passes freely between convergent flap 3 and the housing of the respective actuating cylinder assembly 2.

In addition, in the example illustrated, rod $2i$ of each control actuating cylinder assembly 2 extends from the upstream end of the cylinder, as will be seen in particular in FIGS. 1, 2, 4 and 6. The end of the rod is attached to the median part of transverse crossbar 7, the two ends of which are themselves coupled to the corresponding convergent flap 3 by appropriate linkages, consisting of a connecting link $b_1$ or $b_2$. Each of these connecting links $b_1$, for example, has one of its ends hinged at the corresponding end of crossbar 7, whereas its other end is hinged at the end of the second arm $Lb_1$ of the corresponding bell crank $L_1$. In point of fact, and as will be seen for example at the lower part of FIG. 4, left, the end of the second arm $Lb_1$ of each bell crank has a triple clevis 8 into two arms of which a single clevis is inserted, the single clevis being formed by the corresponding end of connecting link $b_1$.

The divergent flaps, such as 4, have their upstream edges hinged at the downstream edges of the convergent flaps, such as 3 and 3a, in a known manner, and one that thus need not be described in detail so as to pivot about axis F. The divergent flaps, such as 4, are not directly controlled by the actuating cylinders, that is, their movement with respect to convergent flaps 3 are dependent upon the corresponding movement of aforesaid convergent flaps 3. The face of one of the two divergent flaps facing the corresponding control actuating cylinder is made with apendages $4a_1$ and $4a_2$ (FIGS. 1, 4 and 6). Slaving connecting links $B_1$ and $B_2$ each have a first end hinged at the corresponding end of appendage $4a_1$ or $4a_2$, and the other end hinged at a third axis C on the housing of actuating cylinder assembly 2. In the form illustrated, this third axis C on the housing of actuating cylinder 2 is located near the upstream end of the cylinder and approximately over the first axis A as will be seen in FIG. 1. The two hingepoints at axis C are the ends of the shaft $2c_1$ and $2c_2$ in FIG. 2. FIG. 4 shows that this device for slaving to the movements of the convergent flaps applies only to one of the two divergent flaps 4. So far as the intermediate divergent flaps, such as $4a$, are concerned, they are taken care of by the transverse crossbars 9, the two ends of which are supported by the corresponding edges of the closest divergent flaps 4 respectively.

In the form considered, the nozzle in accordance with the present invention has a third annular system of secondary, so-called "cold" flaps, such as 10 (FIGS. 1 and 5). These secondary, or cold, flaps, such as 10, extend, as will be seen in particular in FIG. 1, beyond the primary flaps 3 and 4 at least to and preferably beyond, the downstream edges of the divergent flaps 4, and in a manner such as to envelop these latter without making contact with them. In accordance with the present invention, the upstream edges of certain of the cold flaps 10 also are hinged to the rigid structure previously mentioned, in particular at the downstream ends of the control actuating cylinder assembly 2 at fourth axis D (FIG. 1). In another connection, rod $2i$ of each actuating cylinder is coupled to at least one of two cold flaps by appropriate linkage which links the second arm $Lb_1$ of a bell crank $L_1$ to one of the cold flaps 10. Each linkage comprises a first connecting link $b_1$ and $b_2$ having its upstream end hinged to the second arm, for example $Lb_1$, of the corresponding bell crank $L_1$. As will be seen in FIG. 4, in particular in the middle of the figure, the two first connecting links $b'_1$ and $b'_2$, while connected to two close but different actuating cylinders 2 are themselves close to each other, and are interconnected by the transverse synchronization components, for example, by tubular members such as 11, each of which has first external radial lugs $11a_1$ and $11a_2$ at its two ends. These first radial lugs $11a_1$ and $11a_2$ are inserted in the twin clevises in the lower parts of the downstream ends of the two corresponding actuating cylinder housings and designated $2e_1$ and $2e_2$ in FIG. 2. The different clevises that work together are drilled for holes such as $2j_1$ and $2j_2$ (FIG. 2) to take the pivot shafts forming the fifth hinge axis E at the downstream end of the corresponding actuating cylinder assembly 2, just below the fourth axis D previously mentioned. Each tubular synchronization member 11 also has second radial lugs $11b_1$ and $11b_2$ (FIGS. 1, 4 and 5), each of which also forms a twin clevis in which the downstream end of the first connecting link $b'_1$ or $b'_2$ is hinged. Finally, each of the linkages mentioned has a second connecting link $B'_1$ or $B'_2$, the upstream end of which is hinged at a third radial lug $11c_1$ or $11c_2$ of the tubular synchronization member 11, whereas its downstream end is hinged at $B'_{1a}$ on the face of a cold flap 10 which faces the divergent flap $4a$ (FIG. 5). Seen in FIG. 4, from which the cold flaps have been omitted are only those parts of the second connecting links $B'_1$ and $B'_2$ that are hinged to the tubular synchronization member 11. What can be seen in this FIG. 4, however, is that these second connecting links $B'_1$ and $B'^2$ act on an intermediate cold flap, that is, on a cold flap that extends peripherally at an intermediate divergent flap $4a$ in the space between two adjacent actuating cylinder assemblies 2.

In another connection, in the example of FIG. 4, an axial guide lever 12, triangular in shape for example, and pointing downstream is connected to each of the intermediate divergent flaps $4a$. The upstream end of this triangular lever 12 is hinged to the third radial lugs $11c_1$, $11c_2$ (see also FIG. 1), of the corresponding tubular synchronization member 11 whereas its downstream end, which is not very wide, works with the aforesaid intermediate divergent flap 4a by using a round slot 13 (FIG. 5) in a manner such as to guide the flap axially as it moves.

FIG. 8 is a schematic diagram corresponding to that in FIG. 1, but in which the different components of the nozzle 5 in accordance with the present invention have been simply represented by lines, the crossing points of which represent the hinging of the corresponding members to each other. The cross sections of the nozzle have been designated $S_{10}$, $S_{11}$ and $S_{12}$, respectively, in the plane of coupling of the converging flaps 3 and divergent flaps 4; in the plane of the downstream edges of the divergent flaps 4; and in that of the downstream edges of the cold flaps 10, respectively. Displacements of rod 2i of actuating cylinder assembly 2 are communicated to the corresponding convergent flap 3 by crossbar 7 and the first connecting link $b_1$ and by the second arm $Lb_1$ of bell crank $L_1$, as well as by the symmetrical components located on the other side of the housing of actuating cylinder assembly 2. It is this mechanism that makes it possible to change the position of convergent flap 3 with respect to edge 1 of the duct outlet by pivoting about axis A. It is during these movements of convergent flap 3 that the hinged linkage made up of slaving connecting link $B_1$ and lever $4a_1$, which is integral with corresponding divergent flap 4, changes the position of this latter with respect to convergent flap 3 by pivoting about axis F. These correlated movements of flaps 3 and 4 change the value of the $S_{11}/S_{10}$ ratio, so it thus is possible to adjust the value of this ratio. Simultaneously, the displacements of rod 2i are communicated by first connecting link $b'_1$ to connecting link $b_1'$ and to second radial lug $11b_1$ of tubular synchronization member 11. The corresponding parts located on the other side of the housing of actuating cylinder assembly 2 cause the ends of the two adjacent tubular members 11 to pivot in synchronism about axis E by first radial lugs $11a_1$ and $11a_2$ of the tubular members 11. In turn, third radial lugs $11c_1$ and $11c_2$ of each tubular member 11, following the pivoting of this latter, communicate the movements required to cause corresponding cold flaps 10 to pivot about axis D through connecting links $b'_1$. These latter movements can be expressed in terms of a variation in the $S_{12}/S_{11}$ ratio, which thus can be adjusted to the required value.

The positions of the different flaps 3, 4 and 10, shown by the solid lines in FIG. 7, correspond to the configuration of the nozzle in accordance with the present invention in the case when the engine to which the nozzle is fitted operates with afterburning, which makes it possible to obtain very significant accelerations.

There is relatively little convergence of flaps 3, whereas the divergence of flaps 4 is quite pronounced, the exterior of cold flaps 10 presenting a slight convergence such that the extreme internal part of the flaps 10a extends the corresponding divergent flaps downstream. The positions of the corresponding flaps when the aircraft is flying at subsonic cruising speed and the jet engine, running without preheating, is fitted with the nozzle in accordance with the present invention, have been shown in FIG. 7 by the chain-dotted lines. There is great convergence of flaps 3, slight convergence of flaps 4, and a substantial convergence of flaps 10 in this configuration, but not enough to cause separation phenomenon upstream from the cold flaps.

Figure 9:
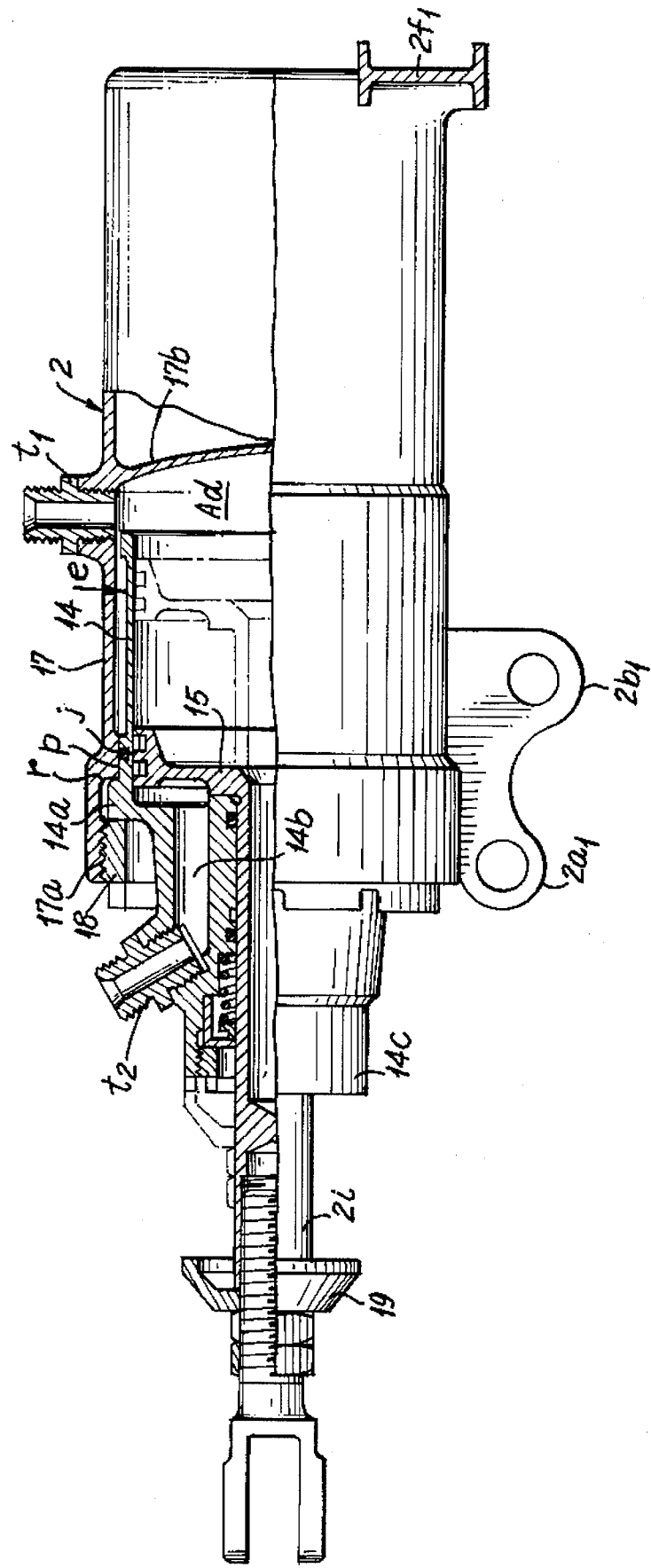
FIGS. 9 and 10 are a front elevation and a partial side elevation of two different embodiments of the control actuating cylinders that can be used to implement the invention.

FIG. 9 shows a particularly advantageous form of an actuating cylinder assembly 2 with linear movement that can be fitted to a supersonic nozzle in accordance with the present invention. In this system formed by cylinder 14, piston 15 and rod 2i of the actuating cylinder is installed with appropriate, radial clearance e in particular, in a very rigid cylindrical housing 17 on which the transverse members, such as $2f_1$ of the rigid structure, as well as the different clevises $2a_1$ and $2b_1$ designed to hinge the different mechanical transmission parts already described are mounted. In another connection, in accordance with the present invention, means are provided for securing cylinder 14 in the cylindrical housing 17 so it can be removed, but in such a way that they will only be in contact with each other at reduced surfaces. In the form shown in FIG. 9, cylinder 14, and cylindrical housing 17 are arranged in a manner such that they are only in contact at the short cylindrical bearing surface p, (having a ring gasket j and at a narrow annular radial bearing surface r, where flange 14a of cylinder 14 is tightened down by annular nut 18 has external threads so it can be screwed into tapped threads 17a at the entrance to cylindrical housing 17. The head of cylinder. 14, which is located inside cylindrical housing 17, is open throughout its section, whereas cylindrical housing 17 is closed off by transverse wall 17b such as to form admission chamber Ad, into which the hydraulic fluid enters via fitting $t_1$ and passes into cylindrical housing 17. The hydraulic fluid is admitted to the other side of piston 15 through a second fitting $t_2$. Channel 14b extends through barrel 14c, thus extending cylinder 14 outside cylindrical housing 17 in a manner such that guidance, and a gasketed exit, of rod 2i from actuating cylinder assembly 2 is ensured. This rod, 2i has a radial stop 19 which is adapted to engage the end of barrel 14c the axial position of stop 19 on rod 2i of The actuating cylinder can be adjusted so as to regulate the travel of piston 15.

Figure 10:
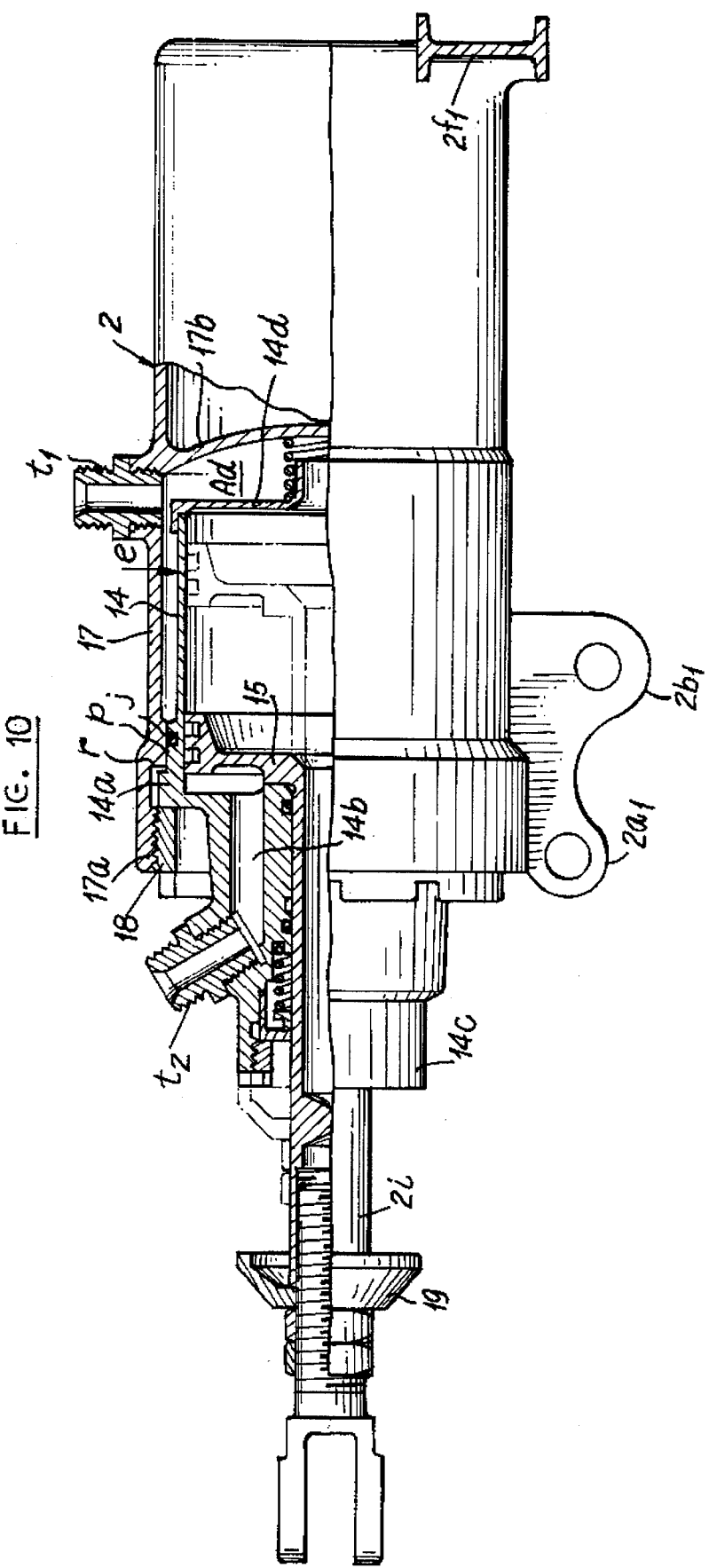

This form of actuating cylinder 2 is particularly advantageous in that the heavy stresses transmitted to cylindrical housing 17 by the transverse members such as $2f_1$ and by the different hinge clevises such as $2a_1$, $2b_1$, etc., are greatly attenuated when transmitted to cylinder 14 proper at small area bearing surfaces p and r. This, in large measure, does away with the risks of deforming cylinder 14 and, as a result, the seizure of piston 15 which is guided by cylinder 14. In another The system 14-15-2i can be easily dismounted as a unit after unscrewing nut 18 from cylindrical housing 17, which latter can remain attached to the other parts of the nozzle, thus facilitating maintenance and adjustments required by the active parts of the actuating cylinder housing 17, which contains the active parts of the actuating cylinder, can be made of a metal such as titanium, for example, whereas active members 14 and 15 of the actuating cylinder can be made of cast iron or steel. In a variant shown in FIG. 10, the head of cylinder 14 is not open throughout its section, but only for a reduced section in the axial range of the cylinder. The purpose of annular head 14d, which can be made in different shapes, and which can, in particular, be integral with the lateral wall of cylinder 14 is in this case, to avoid deformations of the aforesaid lateral wall of cylinder 14, which could also, in this case, lead to seizure of piston 15.

The present invention is not limited to the forms described. It includes all variants. It is not limited to the use of actuating cylinders with linear travel, from which the rod exits from the upstream end. In point of fact, the invention also is applicable to nozzles fitted with actuating cylinders from which the rod exits from the downstream end, or even to rotating actuating cylinders. The relative arrangement of the different hinge-axes A through E, on the housing of each of the actuating cylinders, as well as the realization of each of the flaps, convergent, divergent and cold, and that of the different linkages and other mechanical means that serve to control and synchronize the movements of certain of the convergent and cold flaps, and to slave certain of the divergent flaps are optional. The invention obviously is applicable to nozzles not fitted with cold flaps.

We claim:

1. In a turbojet engine having an outlet duct with an annular downstream edge and a central longitudinal axis, an improved supersonic nozzle assembly comprising:

a). a plurality of actuating cylinder means disposed about the periphery of the outlet duct adjacent its downstream edge;

b). first attachment means attaching the actuating cylinder means to the outlet duct, the attachment means lying in a common plane;

c). a plurality of convergent flaps disposed in an annular array about the central longitudinal axis adjacent to the downstream edge of the outlet duct, the convergent flaps having upstream and downstream edges;

d). a plurality of divergent flaps disposed in an annular array about the central longitudinal axis, the divergent flaps having an upstream edge pivotally attached to a downstream edge of a corresponding convergent flap;

e). a plurality of transverse members extending in a circumferential direction about the central longitudinal axis and interconnecting the actuating cylinder means so as to form a rigid structure that is coaxial with the downstream edge of the outlet duct;

f). a plurality of slaving connecting links each having a first end pivotally attached to an actuating cylinder means and a second end pivotally attached to a corresponding divergent flap; and g). second attachment means pivotally attaching the upstream edge of the convergent flaps to the actuating cylinder means such that, as the actuating cylinder moves between different actuating positions, the positions of the convergent and divergent flaps are adjusted.

2. The improved supersonic nozzle assembly of claim 1 wherein each actuating cylinder means comprises:

a). a rigid cylinder housing pivotally attached about a first axis to the outlet duct via the first attachment means;

b). an actuating cylinder disposed within and attached to the cylinder housing;

c). a piston slidably retained in the actuating cylinder;

d). a piston rod attached to the piston and extending exteriorly of the cylinder and housing; and, e). means to introduce a pressurized fluid into the cylinder on either side of the piston to move the piston and rod linearly between opposite extreme positions.

3. The improved supersonic nozzle assembly of claim 2 wherein the actuating cylinder, piston and rod are removable from the cylinder housing as a unit.

4. The improved supersonic nozzle assembly of claim 3 wherein the area of contact between the actuating cylinder and the cylinder housing is substantially smaller than the length of the actuating cylinder so as to minimize the transfer of extraneous forces from the cylinder housing to the actuating cylinder.

5. The improved supersonic nozzle assembly of claim 4 wherein each second attachment means comprises:

a). a pair of bell crank members pivotally attached to the cylinder housing so as to pivot about a common, second axis, each bell crank member having a first leg attached to an upstream portion of a convergent flap, and a second leg; and, b). connecting link means interconnecting the second legs of the bell crank members with the rod of the actuating cylinder such that movement of the rod causes angular movement of the convergent and divergent flaps.

6. The improved supersonic nozzle assembly of claim 5 wherein the bell crank members are disposed on either side of the cylinder housing and wherein the connecting link means comprises:

a). a crossbar attached to the rod of the actuating cylinder at approximately its mid-point; and b). connecting link members having first ends attached to ends of the crossbar and second ends attached to the second legs of the bell crank members.

7. The improved supersonic nozzle assembly of claim 6 further comprising a transverse tubular member connected to and extending between the first arms of adjacent bell crank members attached to the same cylinder housing.

8. The improved supersonic nozzle assembly of claim 7 wherein the slaving connecting links are disposed on either side of the cylinder housing and have their first ends attached thereto so as to pivot about a third axis.

9. The improved supersonic nozzle assembly of claim 8 wherein the first, second and third axes are parallel to each other and extend generally perpendicular to the central longitudinal axis.

10. The improved supersonic nozzle assembly of claim 9 wherein the third axis is disposed radially outwardly of the first and second axes.

11. The improved supersonic nozzle assembly of claim 10 wherein the transverse members are formed integrally with the cylinder housing and extend from either side thereof in a direction generally perpendicular to the central longitudinal axis.

12. The improved supersonic nozzle assembly of claim 11 comprising means to attach together the extremities of the transverse members of adjacent cylinder housings.

13. The improved supersonic nozzle assembly of claim 5 further comprising:

a). a plurality of cold flaps disposed in an annular array about the central longitudinal axis radially outwardly of the convergent and divergent flaps and extending at least to the downstream edges of the divergent flaps;

b). third attachment means pivotally attaching upstream edges of the cold flaps to a downstream portion of the cylinder housings; and c). second connecting link means interconnecting the cold flaps with the second legs of the bell crank members.

14. The improved supersonic nozzle assembly of claim 13 wherein the second connecting link means comprises:

a). a transverse synchronization member extending generally perpendicular to the central longitudinal axis having a first end pivotally attached to one cylinder housing and a second end pivotally attached to an adjacent cylinder housing;

b). a first pair of radial lugs extending from the transverse synchronization member in a first direction;

c). second radial legs extending from the transverse synchronization member in a second direction;

d). third connecting link means connecting one of the first pair of radial lugs to the second leg of a bell crank member attached to one cylinder housing and the other of the first pair of radial lugs to the second leg of a bell crank member attached to an adjacent cylinder housing; and e). fourth connecting link means connecting the second radial lugs to a corresponding cold flap.

15. The improved supersonic nozzle assembly of claim 14 further comprising an axial guide lever having a first end pivotally attached to the second radial lugs and a second end slidingly attached to a corresponding divergent flap.

16. The improved supersonic nozzle assembly of claim 15 wherein the bell crank members are disposed on either side of the cylinder housing and wherein the connecting link means comprises:

a). a crossbar attached to the rod of the actuating cylinder at approximately its mid-point; and b). connecting link members having first ends attached to ends of the crossbar and second ends attached to the second legs of the bell crank members.

17. The improved supersonic nozzle assembly of claim 16 further comprising a transverse tubular member connected to and extending between the first arms of adjacent bell crank members attached to the same cylinder housing.

18. The improved supersonic nozzle assembly of claim 17 wherein the slaving connecting links are disposed on either side of the cylinder housing and have their first ends attached thereto so as to pivot about a third axis.

19. The improved supersonic nozzle assembly of claim 18 wherein the first, second and third axes are parallel to each other and extend generally perpendicular to the central longitudinal axis.

20. The improved supersonic nozzle assembly of claim 19 wherein the third axis is disposed radially outwardly of the first and second axes.

21. The improved supersonic nozzle assembly of claim 20 wherein the transverse members are formed integrally with the cylinder housing and extend from either side thereof in a direction generally perpendicular to the central longitudinal axis.

22. The improved supersonic nozzle assembly of claim 21 comprising means to attache together the extremities of the transverse member of adjacent cylinder housings.

* * * * *